(12) United States Patent
Rohrer

(10) Patent No.: US 9,127,640 B2
(45) Date of Patent: Sep. 8, 2015

(54) MULTI-CAPTURE MODE WAVE ENERGY CONVERTER WITH SUBMERGIBLE FLOAT

(71) Applicant: John W. Rohrer, York, ME (US)

(72) Inventor: John W. Rohrer, York, ME (US)

(73) Assignee: Rohrer Technologies, Inc., York, ME (US)

( * ) Notice: Subject to any disclaimer, the term of this patent is extended or adjusted under 35 U.S.C. 154(b) by 0 days.

(21) Appl. No.: 14/101,325

(22) Filed: Dec. 9, 2013

(65) Prior Publication Data

US 2014/0097617 A1 Apr. 10, 2014

Related U.S. Application Data

(63) Continuation-in-part of application No. 13/506,680, filed on May 8, 2012, now Pat. No. 8,614,520, which is a continuation-in-part of application No. 13/199,607, filed on Sep. 2, 2011, now Pat. No. 8,604,631.

(51) Int. Cl.
| | |
|---|---|
| *F03B 13/10* | (2006.01) |
| *F03B 13/12* | (2006.01) |
| *H02P 9/04* | (2006.01) |
| *F03B 13/14* | (2006.01) |
| *F03B 13/18* | (2006.01) |
| *A01C 5/00* | (2006.01) |

(52) U.S. Cl.
CPC .............. *F03B 13/14* (2013.01); *F03B 13/182* (2013.01); *F03B 13/186* (2013.01); *F05B 2270/18* (2013.01); *Y02E 10/38* (2013.01)

(58) Field of Classification Search
USPC ............................................. 290/42; 111/52
See application file for complete search history.

(56) References Cited

U.S. PATENT DOCUMENTS

| | | | | |
|---|---|---|---|---|
| 3,651,870 | A | * | 3/1972 | Calkins ........................... 172/44 |
| 3,963,079 | A | * | 6/1976 | Carlucci ........................ 172/200 |
| 4,098,084 | A | | 7/1978 | Cockerell ........................ 60/500 |
| 4,180,005 | A | * | 12/1979 | Zumbahlen ...................... 111/52 |

(Continued)

FOREIGN PATENT DOCUMENTS

| | | |
|---|---|---|
| WO | 2008/004893 A1 | 1/2008 |
| WO | 2008/111849 A1 | 9/2008 |

(Continued)

OTHER PUBLICATIONS

Moe and Ersdal, "Aker WEC Prototype Model Test", Final Report, Jul. 7, 2014, pp. 1,3,5,9; Marinet EC FP7 Program (Retrieved from the Internet on Dec. 3, 2014 @ www.fp7-marinet.eu/access-menu-post).

(Continued)

*Primary Examiner* — Pedro J Cuevas
(74) *Attorney, Agent, or Firm* — Mark D. Lorusso

(57) ABSTRACT

An ocean wave energy converter (WEC) uses one or more buoyant elongated float(s) mechanically linked to a motion-stabilized frame by either swing or lever arms or down-sloping tracks that define the motion of the floats relative to the frame to capture both heave and surge wave energy forces. The submerged depth of the frame and attached float(s) is adjusted for optimal wave energy capture or submerged sufficiently to fully submerge the float(s) during severe sea conditions. The elongated float's total submergence during severe sea states and the WEC's self-orienting capability, parallel to oncoming wave fronts, allows the WEC to intercept and capture maximum wave energy per unit of WEC volume, weight and cost.

32 Claims, 11 Drawing Sheets

(56) References Cited

U.S. PATENT DOCUMENTS

| | | | | |
|---|---|---|---|---|
| 4,212,254 | A * | 7/1980 | Zumbahlen | 111/52 |
| 4,295,800 | A | 10/1981 | Packer | 417/333 |
| 4,426,950 | A * | 1/1984 | Cholet | 114/245 |
| 5,405,250 | A | 4/1995 | Vowles et al. | 417/331 |
| 7,476,137 | B2 | 1/2009 | Stewart et al. | 441/1 |
| 7,737,568 | B2 | 6/2010 | Vowles et al. | 290/42 |
| 7,785,163 | B2 | 8/2010 | Spencer et al. | 441/1 |
| 7,878,734 | B2 | 2/2011 | Bull et al. | 405/76 |
| 7,909,536 | B2 | 3/2011 | Dick | 405/76 |
| 8,093,736 | B2 | 1/2012 | Raftery | 290/42 |
| 8,123,579 | B2 | 2/2012 | Gerber | 441/1 |
| 8,317,555 | B2 * | 11/2012 | Jacobsen et al. | 440/12.63 |
| 8,508,063 | B2 | 8/2013 | Rhinefrank et al. | 290/53 |
| 8,614,520 | B2 * | 12/2013 | Rohrer | 290/42 |
| 2010/0317244 | A1 * | 12/2010 | Jacobsen et al. | 440/12.63 |
| 2011/0068579 | A1 | 3/2011 | Dullaway | 290/53 |
| 2012/0317970 | A1 | 12/2012 | Edvardsen | 60/496 |
| 2013/0081388 | A1 | 4/2013 | Straume et al. | 60/496 |
| 2013/0113211 | A1 * | 5/2013 | Rohrer | 290/42 |

FOREIGN PATENT DOCUMENTS

| | | |
|---|---|---|
| WO | 2008/135046 A2 | 11/2008 |
| WO | 2011/071390 A2 | 6/2011 |

OTHER PUBLICATIONS

Salter and Lin, Wide Tank Efficiency Measuremens on a Model of the Sloped IPS Buoy, Department of Mechanical Engineering, University of Edinburgh EH9 3JL, Scotland, 3rd.

Author unknown. Sting Ray wave energy converter from Columbia Power Technoogies website, www,columbiapwr.com/ray-series/; 2013, all pages.

Author unknown, Wave Energy Conversion rack and pinion spar buoy development project, The University of Warwick website, www.2.warwick.ac.uk/fac/sci/eng/meng(waveenergy/.

* cited by examiner

Vowles / WET

Aquamarine "Oyster"
(Prior Art)

Sloped IPS Buoy — Fixed Position

McCabe Wave Pump

FIG. 5

MULTI-CAPTURE MODE WAVE ENERGY CONVERTER WITH SUBMERGIBLE FLOAT

RELATED U.S. APPLICATION DATA

Continuation-in-part of application Ser. No. 13/506,680 filed on May 8, 2012 (and PCT/US2012/053590) which is a continuation-in-part of application Ser. No. 13/199,607 filed on Sep. 2, 2011.

Provisional Application No. 61/628,732 filed on Nov. 5, 2011.

CROSS-REFERENCE TO RELATED APPLICATIONS

This is a continuation-in-part of U.S. application Ser. No. 13/506,680, filed May 8, 2012 (corresponding to PCT/US2012/053590), which is a continuation-in-part of U.S. application Ser. No. 13/199,607, filed Sep. 2, 2011, the contents all of which are incorporated in their entirety herein by reference.

FIELD OF THE DISCLOSURE

This disclosure relates to devices for producing electrical power, pressurized water, or other useful work from surface waves on a body of water.

More particularly, this disclosure relates to wave energy converters (or "WECs") of the wave terminator or wave energy absorption barrier type wherein one or more elongated wave energy absorbing floating bodies or surface absorption barriers, having a horizontal plane width greater than their fore to aft depth, are oriented approximately parallel to oncoming wave fronts or swells.

The subject disclosure relates primarily to WECs which, unlike more common vertical "heave only" buoys, have at least one surface float mechanically linked to a buoyant motion-stabilized frame such that the float is initially and primarily displaced both vertically upward and rearward (relative to the oncoming wave direction) by oncoming wave crests and then both downwardly and forwardly during subsequent oncoming wave troughs, the mechanical linkage driving a power take-off apparatus. This combined vertical and lateral motion of the one or more floats allows the WEC of the present disclosure to capture substantial portions of both wave heave (potential vertical) and surge (kinetic lateral) energy. Heave and surge wave energy each comprises exactly half of the total wave energy in deep water.

BACKGROUND OF THE DISCLOSURE

Commercialization of ocean wave energy converters or WECs lags significantly behind solar and wind energy even though ocean wave energy is significantly more concentrated, predictable and persistent than the solar energy which produces winds or wind energy that produces ocean waves and swells. Water's relatively high density (over 800 times greater than air) largely accounts for the higher energy density of waves, but also increases the challenges of severe sea-state survivability for WECs. Over 100 WEC designs have been proposed over the last century, yet only a handful of prototypes have been deployed only recently in ocean environments at "commercial scale" (over 150 kw electrical output). No utility scale (over 1 MW) WECs have yet been ocean deployed.

To make such WECs survivable in typical 15 meter severe storm waves, most currently proposed WECs are made of heavy steel plate (like ocean going ships that can survive 15 meter waves). This makes the WECs both expensive and unresponsive (inefficient) during more normal sea-states. Most WECs have buoy like shapes and are known as "point absorbers" and have at least one floating component which moves in response to oncoming waves (i.e., a flop-gate, buoy, float, or raft) flexibly attached to a second moving or relatively stationary component (a seabed, seawall attachment, or a comparable or more massive floating component). As oncoming waves move one component relative to another, a resistive force mechanism absorbs energy (resistive force× distance=energy or work captured).

The "IDEAL WEC" would be light weight (for high wave responsiveness in all sea conditions), low cost, with high energy capture efficiency in most sea-states, and yet be survivable in severe sea states. It would be deployable on the ocean surface and in deep water where wave energy levels are highest and potential conflicts with fishing, boating and shoreline visual impacts are minimized. It would be elongated (in the direction parallel to oncoming wave fronts), rather than circular or buoy like in section, thus intercepting maximum wave front energy per unit of WEC volume and weight and, therefore, have the lowest possible cost per unit of WEC width. Circular section and other narrow-width buoys must square their sectional area and cube their volume (exponentially increasing their weight and cost) to intercept and access the energy from additional oncoming wave fronts. Because exactly half of all deep water wave energy is "potential" or "heave" energy (mass of water between the vertical distance between each crest and trough) with the remaining half "kinetic" energy (from the mass of water particle movement), an efficient WEC must capture most of both wave energy components (or be very inexpensive).

Vertically-heaving buoys can only capture the heave or potential energy component that likely cannot exceed 50% of total wave energy. Near shore deployed floating, bottom pivoting "flap" or "pivoting" or "hinged" gate-type WECs likely can only capture the kinetic or "surge" energy component of near shore waves that have already lost, to bottom friction, a major portion of the energy they contained in deep water.

Another necessity to high wave energy capture efficiency is to match the wave resistive force of the WEC to oncoming waves. If the device is too "stiff" or resistive, it will reflect much or most of the impacting wave, partially or totally canceling succeeding oncoming waves, rather than absorbing the wave's energy. If the device's resistive force is too weak, the wave will pass over, under, or through the WEC rather than being absorbed by it. Because few successive ocean waves are alike, an ideal efficient WEC must sense each successive wave's potential energy and vary the device's resistive force with each wave (or at least adjust to the average wave amplitude and frequency for that time period). If the motion of the WEC itself produces its own waves, those waves carry away energy not absorbed by the WEC, and potentially cancel or reduce the energy of oncoming waves.

WECs which have their mass and buoyancy "tuned" to a specific amplitude and period for optimum performance, ("resonance" dependent WECs) such as with the uniform waves produced in a wave test tank, have dismal performance in real ocean wave conditions that involve random wave amplitudes and periods. The present disclosure provides utility scalable, surface deep-water deployable WEC's with the properties previously described for an "Ideal WEC" including high wave-energy-capture efficiency in real random seas, light weight, low cost, and severe-sea survivability.

DESCRIPTION OF THE PRESENT DISCLOSURE

According to aspects of the present disclosure, one or more adjacent buoyant bodies, individually or collectively forming an elongated buoyant wave absorbing float or barrier, is pre-oriented or self-orienting such that its elongated one or more floats are approximately parallel to oncoming or prevailing wave fronts. The elongated float(s) generally have a horizontal wave-front-facing width greater than the horizontal fore to aft depth of the floats(s), excluding any extension plates or attachments thereto. The elongated float(s) is movably mechanically linked via tracks, slides, swing or lever arms, or other mechanical means, to a relatively motion-stabilized or stationary second floating frame, which in several embodiments has means to controllably adjust its buoyancy, or submerged depth. The mechanical linkage is configured such that the orientation and wave-induced motion of the at least one float is defined relative to the frame moving initially and primarily upward and rearward with oncoming wave crests and subsequently downward and forward with subsequent oncoming wave troughs.

The shape, buoyancy, and generally sloped movement of the buoyant float is such that its movement produces little or no energy-absorbing back wave. When the float(s) are mechanically linked to the frame via linear or curvilinear tracks, the tracks are in an inclined downward orientation relative to the direction of oncoming wave fronts. Where the mechanical linkage is by lever or swing arms, the arms are generally relatively long and generally rotatably attached to the frame at a location substantially below the frame's normal operating still-water line. The arms are generally inclined upward from the frame to the float and towards the direction of oncoming wave fronts. The upward and forward orientation of the arms can be established, or restored by altering the submerged depth of the adjustable depth frame relative to the float and still-water line, affixing gravity weights on the arms forward of the arms attachment point with the frame, or forcing the arm with attached float forward by reversing the power take-off apparatus (using a generator as a motor).

The approaching wave crest induced upward and rearward sloped or arcuate movement of the elongated buoyant barrier(s), and in most embodiments, the subsequent wave-trough induced downward and forward sloped or arcuate movement is resisted by an energy absorbing power take-off ("PTO") apparatus, driven by the relative motion between the first floating elongated float(s) and the relatively stationary or stabilized frame. In several embodiments, the controllable submerged depth of the frame allows the mass and buoyancy of both the frame and the movably attached float(s) to be adjusted to varying sea conditions to optimize, or maximize, wave energy capture and to allow total submergence of the float(s) for protection, or survival during severe sea states. This use of a controllably submerged frame to optionally fully submerge the WEC's floats is unique within the WEC prior art and allows the floats of the present disclosure to be made of light weight, responsive, inexpensive materials such as fiber reinforced plastics or fabricated aluminum.

In various embodiments of the present disclosure, the resistive force is applied by the PTO driving a rotary electrical generator directly, through a rack and pinion, a capstan, a belt, a helical drive, a linear electrical generator, or a low pressure or high pressure hydraulic or pneumatic turbine/motor generator system, with or without a constant output accumulator tank, or by other fluid pumping, or mechanical drive means. In some embodiments, the electrical, hydraulic, or pneumatic PTO force, or torque can be varied and computer controlled, or programmed to match the sensed size and speed of individual, or average, oncoming waves to optimize, or maximize wave energy capture efficiency.

Such mechanically linked attachment of the first elongated buoyant float(s) to the fixed or relatively stabilized floating frame or mount in various embodiments can be, by one or more linear or arcuate low friction roller tracks or slides, attached to the frame with either a fixed, or adjustable, slope angle, and may be down-sloping toward oncoming waves between about 15° to about 65° from horizontal. Alternatively, one or more relatively long (relative to average wave height) lower-frame-attached pivoting, or lever arms can provide the mechanical linkage defining the orientation and relative movement of the elongated float(s).

In at least some embodiments of the present disclosure, a substantially stationary or stabilized controlled submergence frame is utilized. The frame's controlled submergence apparatus may include seawater ballast tanks, air bladders, bellows, gravity weights, cable or tension leg attachments to the sea bed, and combinations thereof. Such submerged depth apparatus may also be utilized to adjust the pitch or slope angle of the tracks or the swept arc of the swing or lever arms of the present disclosure to maximize wave energy capture efficiency, or to totally submerge the first buoyant floating float(s) for survival during severe sea states.

In several embodiments of the present disclosure, the moving mass and buoyancy of the float(s) is also variable by controllably adjusting the float's sea water ballast. The increased ballast mass of floats(s) can provide added gravity return force to both return the float(s) to its wave trough position and to do work (recover energy) by return travel of the float(s). The amount of return force recovered (or required) is also dependent on the constrained slope angle or arc of travel between the float and frame. If the float(s) is too massive, its responsiveness to oncoming waves, especially those of short wavelength, is reduced. If its mass is too light, it may not provide enough return force for significant energy capture during its return stroke or may not complete the downward return stroke unless assisted by the power take-off apparatus operating in reverse (as a motor). It is, therefore, desirable to have the mass of the elongated first barrier(s) variable, being heavier in heavy longer wave length sea states and swells and lighter in lighter sea conditions, or alternatively gaining mass during upstrokes and losing mass near the bottom of down strokes.

In at least some embodiments of the present disclosure, a fixed position downward inclined wave focusing or "shoaling plane" or plate is attached to the frame below the float(s) and extends forward in front of the float's wave impacting forward face at approximately the same downward sloping angle or arc as the float(s)' path. This shoal plane both increases wave amplitude and the surge or impacting force on the float(s). Optional upright converging vertical side walls on the shoaling plane can further enhance these wave focusing effects. This shoaling plane also provides enhanced pitch and heave stability to the frame. The wave-impacting forward face of the float(s) can also or alternatively have a forward extended lower surface at the same downward slope angle or arc to further increase wave amplitude and impacting force, especially if the fixed position wave focusing plane or plate is not utilized.

DISTINGUISHING FEATURES OVER THE PRIOR ART

The present disclosure is clearly distinguished from the prior art, being the only WEC having;

1. At least one elongated float oriented parallel to oncoming wave fronts.
2. A controllable submerged depth buoyant frame stabilized against wave-induced motion that can fully submerge the one or more floats during severe sea states.

3. A mechanical linkage defining the orientation and motion of the at least one float relative to the frame.

Additional distinguishing features of embodiments of the disclosure include;
1. The mass, buoyancy, and submergence of the elongated float(s) can be controlled (for performance optimization or total submergence) by controllably changing the submerged depth of the frame, or by operating the power take-off apparatus in reverse (as a motor) causing seawater ballast to flow into, or out of, the float's cavities.
2. The mechanical linkage tracked slope or lever arm are between the float and the frame allows the float to concurrently capture both surge and heave wave energy with the same power take-off.
3. The submerged depth and orientation of the frame can be controlled by changing its buoyancy with seawater ballast tanks, submerged air bladders, or other means.
4. Additional distinguishing features include wave focusing and/or shoaling planes to enhance energy capture efficiency and frame hydraulic stability.

Related Art FIG. 1 shows a near-shore-only deployable, seabed mounted, bottom hinged vertical buoyant "flap gate" generic type WEC utilizing a pressurized water PTO system called the "Oyster" currently being developed by Aquamarine. Because "Flap" or "hinged gate" type WECs are vertically oriented and move in a lateral arc about the vertical, they capture only, or primarily the "surge" or lateral wave energy component (not the heave or vertical component) of near-shore waves where energy has been substantially reduced by bottom friction.

Flap gates, unlike the present disclosure, produce a significant "back wave" which further reduces the energy otherwise captured. Flap gates, by their geometry, have excessive resistive force, but little travel distance near their bottom hinge and insufficient resistive force near the top or water surface where wave kinetic impact energy is greatest. Embodiments of the present disclosure using swing or lever arms utilize an arm length at least twice the float height (flap gates have no arms) with arms extending forward of vertical for both heave and surge capture. Seabed mounted flap gates do not use floating controlled submergence frames, like the present disclosure, to maintain optimal submerged depth during all tides.

Gerber U.S. Pat. No. 8,123,579 and Dick U.S. Pat. No. 7,909,536 being commercially developed as the OPT "Power Buoy" and "Wavebob" respectively, are good examples of "point source absorbers", not elongated or sloped absorption barriers like the present disclosure. They are vertical "heave only" WECs catching no surge wave energy component. Neither Dick '536 nor Gerber '579 describe or claim sloped motion between their circular section (not elongated) surface ring or "donut" shaped float and their heave-vertical motion stabilized center spar. Both related art WECs rely on vertical heaving "resonance" for acceptable capture efficiency and both produce substantial efficiency reducing back waves, unlike the present disclosure. Dick '536 can "de-tune" (reduce capture efficiency) by reducing center spar or frame stabilizing seawater ballast and raising the spar during heavy seas (allowing it to rise and move with the float) by reducing spar water ballast. The present disclosure increases frame seawater ballast during heavy seas to produce partial or full submergence of the float (using a different water ballasting means than Dick '536).

Related Art FIG. 3 (and internet reference) shows a wave tank test scale model of the "Sloped IPS Buoy" proposed and tested by the University of Edinburgh from 1995 to 1999 by Salter and Lin. When the non-buoyant sloped slide or track of the FIG. 3 device was rigidly fixed to the wave tank bottom, it showed acceptable capture efficiencies. While the Sloped IPS float also has a sloped motion, the present disclosure is distinguished from the Sloped IPS buoy by use of at least one elongated float reacting against a buoyant frame with controlled submergible depth which can partially or fully submerge the float.

Vowles U.S. Pat. No. 7,737,568 (Related Art FIG. 2), which is very similar to the Related Art sloped IPS Buoy of FIG. 3 (which preceded it by several years), also describes a buoyant float which is also constrained to a downward sloping movement for combined "heave" and "surge" wave energy capture, and also uses a non-buoyant spar or frame or "driven linkage", unlike the buoyant and controlled submerged depth frame of the present disclosure. Vowles '568 was apparently unaware of the extensive prior sloped IPS Buoy work done at the University of Edinburgh first disclosed at the 1995 Lisbon Conference, (Internet reference of October 1998 paper by Salter & Lin). Vowles '568 describes both a non-buoyant seabed affixed spar (in his FIG. 16) and a non-buoyant slack moored spar with drag plate (in his FIG. 15).

Neither the sloped IPS Buoy (Salter & Lin) nor Vowles '568 describe or claim the motion-stabilized, buoyant-controlled submergence frame of the present disclosure. Without these capabilities of the present disclosure, maintaining a constant slope angle, adjusting that angle for optimized energy capture, and adjusting the OWEC's submerged depth for optimized or maximized energy capture efficiency, or to protect against severe sea conditions via total submergence and survival is not possible. The floating frame of the present disclosure with its ballasted mass, shoal plane and drag plates also drastically improves frame heave, surge and pitch stability, important to acceptable capture efficiency. In contradistinction, if only the moving float (not the non-buoyant spar or frame) is providing all the buoyancy for the OWEC, effective frame stabilization, even with '568's drag plate, is unlikely, and control, or adjustment of slope angle and submerged depth, is, of course, impossible. Full submergence of any elongated and wave front parallel WEC surface float(s) is necessary for its survival from broadside impacts of the 15 meter high waves common to ocean storms. Neither the Sloped IPS Buoy of Salter and Lin, Vowles '568, or other related art describe or claim WECs with elongated wave front parallel floats that can be fully submerged for severe seas survival.

With respect to other cited related art, Gerber '579 describes a buoy with a center spar type WEC with the buoy/float having variable, but positive buoyancy with cavities and apertures to accept and release sea water to reduce the external force required to submerge the float during severe seas. Gerber '579 does not use a change in the submerged depth of the spar to provide the force to submerge the float like the present disclosure. Gerber '579 also lacks the elongated wave front parallel float and the float to frame mechanical linkage of the present disclosure that allows sloped or arcuate motion to capture both heave and surge wave energy.

Related art Straume (2013/0081388 A1) describes a wave activated pneumatic pump to control the submersion of a WEC float rather than use the controlled submerged depth stabilizing frame of the present disclosure. Related art Eder '459 like others preceding it (cited Warwick U. rack and pinion spar buoy project) describes a buoy and center spar type WEC where the relative motion between the buoy/float and the spar is mechanically linked to a rotary electric generator by a rack and pinion assembly. While the present disclosure describes the use of several mechanical linkage types to drive a rotary generator including a rack and pinion (differing from that of Eder), Eder does not describe the use of a rack and pinion in a WEC having at least one elongated wave front parallel float mechanically linked to a motion-stabilized, controlled-submergence frame that can fully submerge the float.

One embodiment of the present disclosure utilizes two elongated wave front parallel floats, one located forward of the stabilizing frame and the second aft whereby each is connected by lever arms to the frame with at least the forward arm being connected at a point substantially below the normal operating still water line with each driving a common or separate power take-off apparatus. The McCabe wave pump (Fog. 4), Cockerall Raft '084, and the more recent Columbia Sting Ray (cited internet publication) all use two floats fore and aft of a floating frame, but all differ from the present disclosure in that their frame attachment points are all at, or above, the still water line thereby precluding the floats from traveling in the long radius upward and rearward arcuate, or sloped motion of the present disclosure, such motion being required to capture the majority of both heave and surge wave energy.

BRIEF DESCRIPTION OF THE DRAWINGS

FIG. 5 is a semi-submerged side elevational view of an embodiment of the present disclosure with an elongated float, having a top cavity allowing moving mass to be adjusted with seawater ballast, with its motion defined to a downward sloping path normal to oncoming wave fronts by roller tracks affixed to its submerged depth controlled frame.

DETAILED DESCRIPTION OF THE DISCLOSURE

Figure 2:
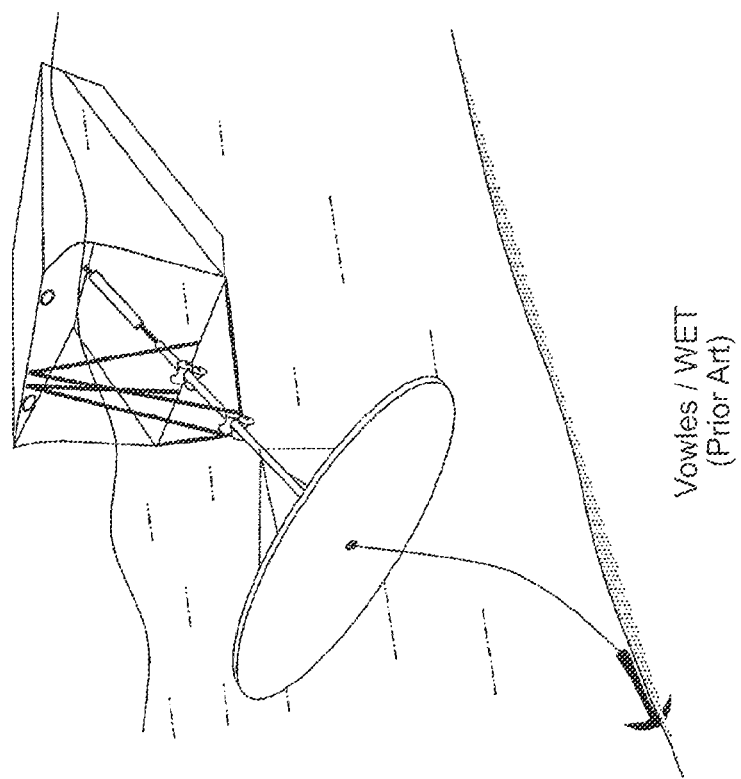
FIG. 2 is a Related Art semi-submerged isometric view of Vowles '568 assigned to Wave Energy Technologies of Winnipeg, Canada.
Figure 1:
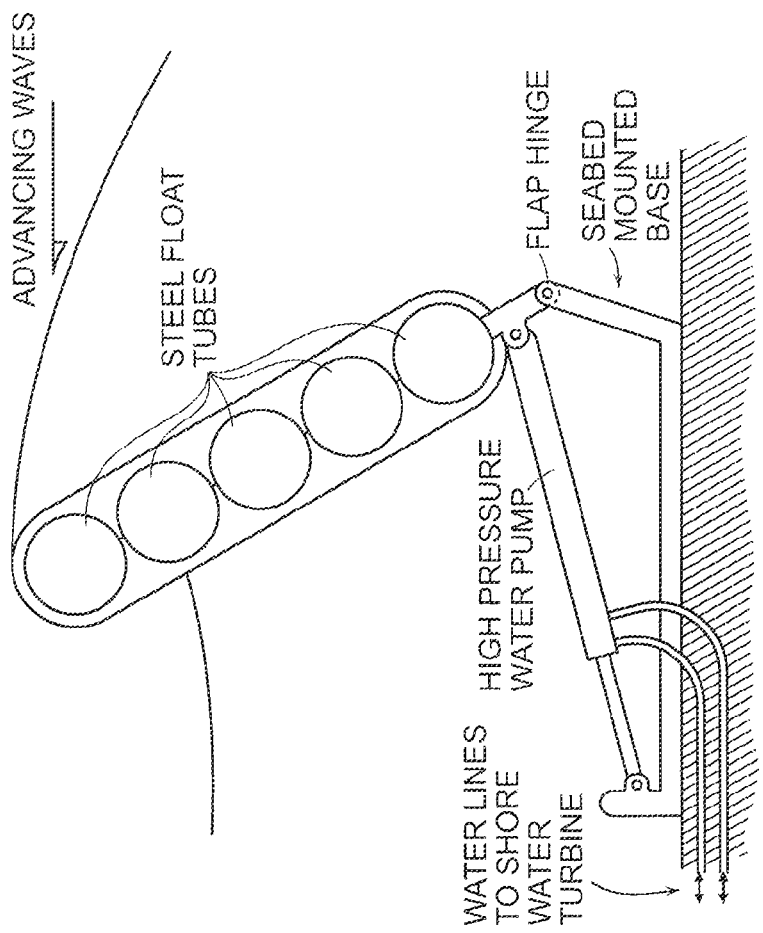
FIG. 1 is a semi-submerged side elevational view of the Related Art "Oyster" near-shore, seabed deployed, vertical, buoyant "flap gate" type WEC being commercialized by Aquamarine of Belfast (N. Ireland) and Inverness Scotland.
Figure 3:
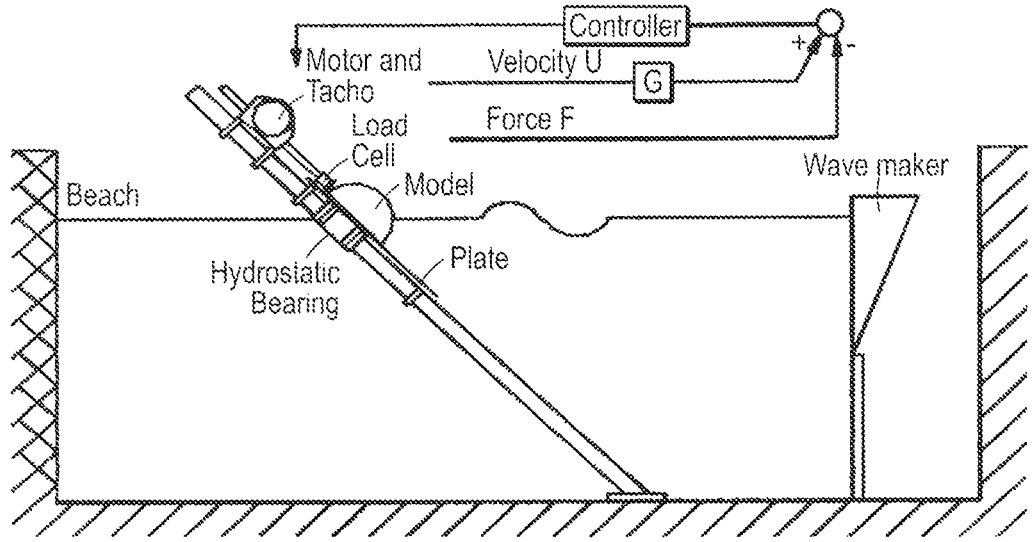
FIG. 3 is a Related Art semi-submerged side elevational view of the "Sloped IPS Buoy" with rigid mount as tested at the University of Edinburgh, Scotland in 1998.
Figure 4:
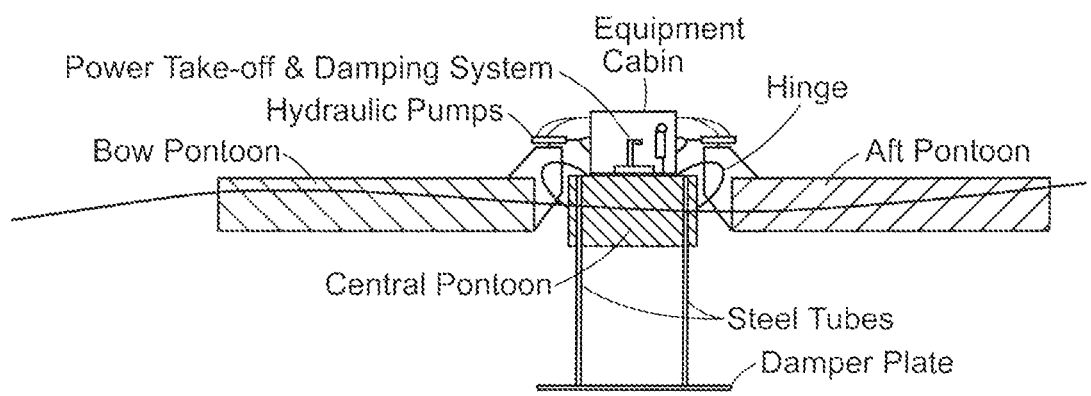
FIG. 4 is a Related Art semi-submerged side elevational view of the McCabe Wave Pump.

The features and limitations of the Related Art WECs of FIG. 1 through FIG. 4, inclusive, are previously described and discussed in the previous Distinguishing Features over the Prior Art section.

Figure 5:
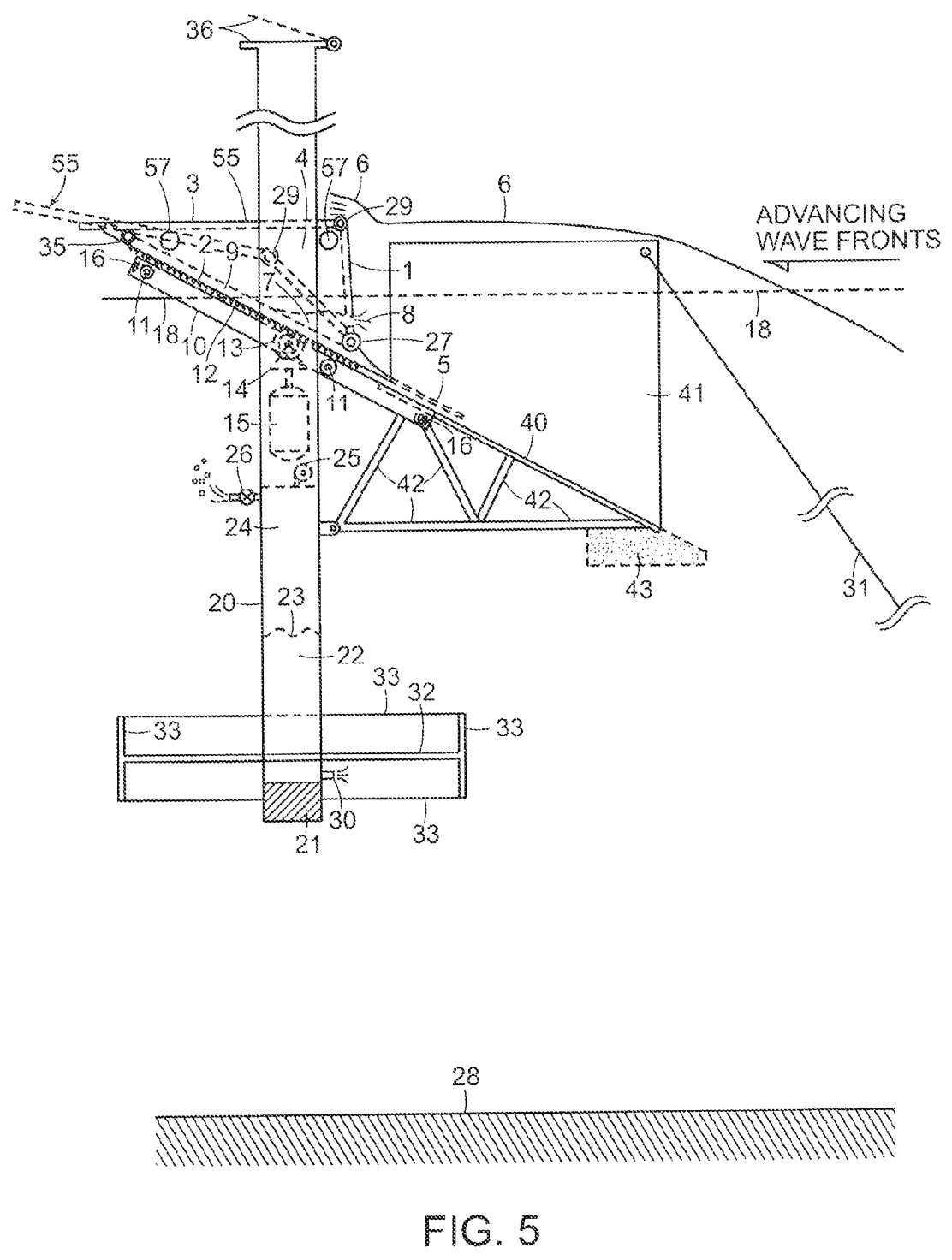

Referring to FIG. 5, an embodiment of the disclosure is shown wherein one or more relatively lightweight floating elongated buoyant float(s) or barrier(s) having a wave front facing and impacting forward face 1 which may be buoyant or non-buoyant, concave, convex, flat (as shown) and sloping upwardly, or generally vertical and outwardly and being a rigid (shown) or a hinged panel (shown) or a flexible wave impacting front wall (not shown), with the float having a relatively flat and upward and rearward sloped bottom wall 2. A cavity in the float(s) 4 created by the forward wall 1 and a bottom wall 3 can have an open upward facing cavity (not shown), be solid, or hollow (not shown), or have a top cover plate 55. This top or "splash cover" 55, prevents excessive seawater 6 from impacting waves from entering the cavity and is rotatable via hinge 29 where it attaches to the top of the forward face 1.

The elongated float(s), or multiples of the floats, arranged side-by-side, have a horizontal width, aligned approximately parallel to oncoming wave fronts, substantially greater than the horizontal front to rear depth of the float(s), excluding extension plate 5 or other appendages. The float(s) can have fill holes or apertures 57 along its/their upper side walls (as shown) and/or upper cover 55 (not shown), which holes may be fitted with water-pressure-activated covers (not shown) configured to open when the float(s) are controllably submerged so as to allow seawater to flood the cavity 4 reducing or eliminating the float's buoyancy. The floats front face 1 and or lower side walls may also have drain ports 8 configured to allow seawater to drain from the cavity 4 when above water level 6 while not allowing significant seawater entry when submerged. An optional extension plate 5 may protrude from the lower front of front wall 1 at approximately the same angle as sloped bottom wall 2 and sloped frame track 10. The vessel can be fabricated from metal, composites, or foam filled composites. It is often advantageous to have the empty float mass relatively low such that it is buoyant and floating in response to even small oncoming waves. During other sea conditions it is advantageous to maintain some seawater ballast 7 in cavity 4.

The elongated buoyant float(s) is/are mechanically linked by downward sloping track(s) 10, defining the movement and axis of orientation of the float(s), to frame columns 20 by wheels 11 affixed to the bottom 2 or sides of the float(s). The tracks 10 are set at either a fixed or adjustable downward sloped angle, preferably between about 15° and about 65° from horizontal, to constrain the float(s) to a downward and upward sloping motion. This down sloped motion allows the capture of both vertical heave and lateral surge/kinetic wave energy forces (unlike heave only buoy type WECs), and provides more time and travel or stroking distance to make such wave energy capture. This sloped motion combined with the shape of the float's bottom 2 at approximately the same slope angle, results in little or no "back wave" produced as the float is forced rearward by oncoming waves. Such "back waves" are a major source of energy loss in most other types of WECs.

Figure 6:
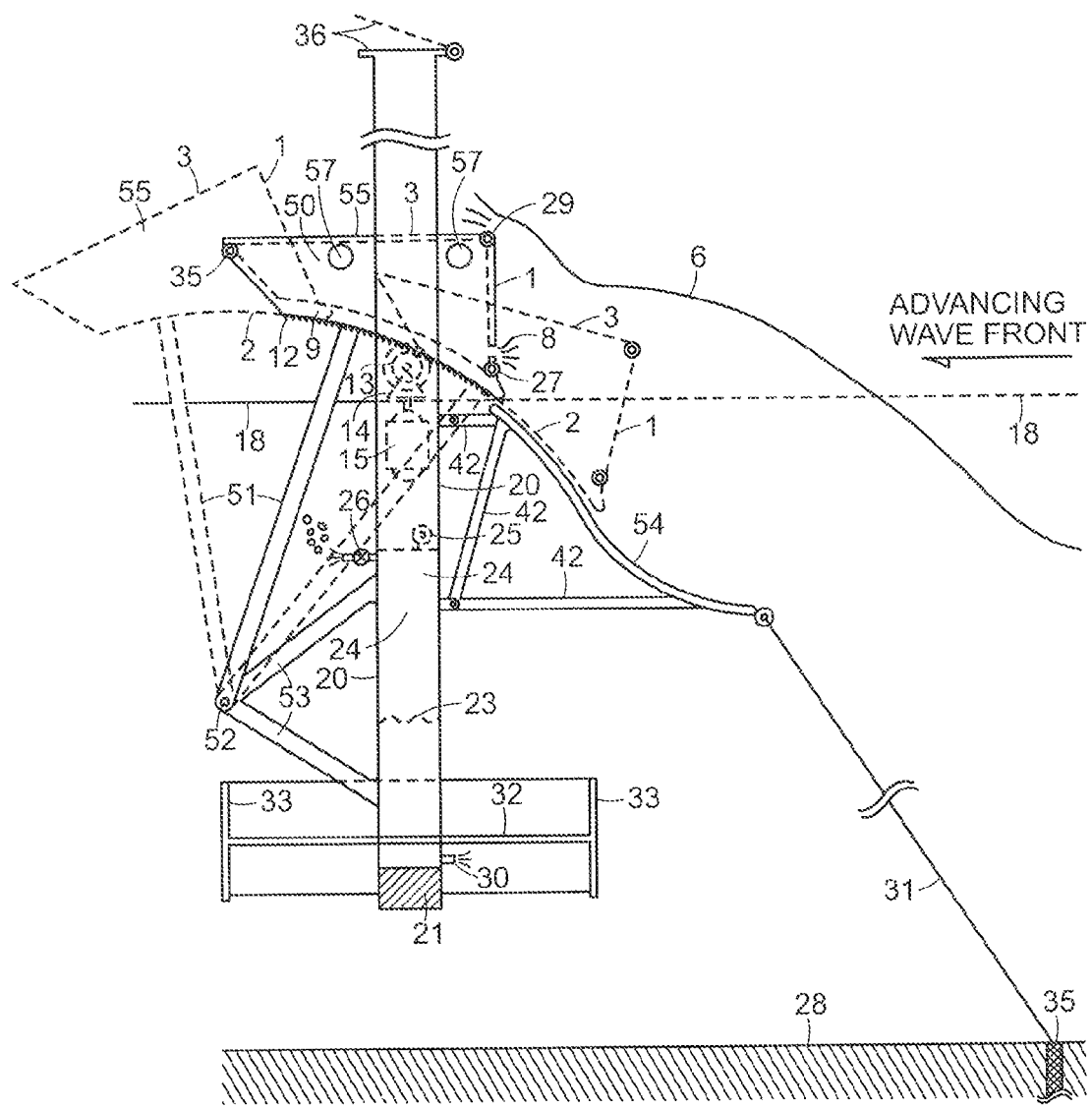
FIG. 6 is a semi-submerged side elevational view of an embodiment of the present disclosure, with an elongated float, with its motion defined by an arcuate path by lever or swing arms rotatably mounted to the frame substantially below the still water line ("SWL").

Alternative low friction downward sloping linear, curvilinear or arcuate motion-constraining means can be used including tracks 10 (as shown), linear or hydrostatic bearings, slides or the like (not shown), or lever or swing arms (FIG. 6 and beyond). Both ends of the track(s) are equipped with springs 16, or other mechanical or hydraulic end stop cushioning devices to prevent severe end stop shocks from unanticipated large waves. Such shocks are also reduced or eliminated by: a) increasing the resistive load of the onboard generator 15 or other PTO system and/or; b) allowing some pitching motion in the mounting frame 10 and attached vertical frame column(s) 20, in the direction of oncoming waves during wave crests and rebounding toward wave fronts during wave troughs; and/or c) allowing any residual seawater ballast 7 in the top cavity 4 to slide out of the cavity if and when the float is rapidly decelerated towards the end of its upstroke.

Impacting wave crests 6 raise the buoyant float(s) upward and rearward producing a "power stroke" using both vertical (heave) buoyant forces and wave impacting lateral (surge) forces. Concave barrier's 9 mass can also be adjusted or controlled by utilizing a compressed air 25 seawater ballast system in frame columns 20 to adjust the frame's depth (and the depth of tracks 10) allowing cavity 4 to fill through drain ports 8 and/or supplemental sidewall ports, (like 57 in FIG. 11).

The movements of the vessel(s) along the track(s) 10 or other motion defining means are resisted by a power take-off (PTO) apparatus such as, but not limited to, the gear rack 12 affixed to the vessel bottom 2 driving pinion 13 through bevel gears 14 to an electrical generator 15. Alternative PTO means (not shown) include direct driven rotary or linear electric generators, hydraulic cylinders, or rotary pumps driving hydraulic motor or turbine generators including use of a pressurized hydraulic fluid accumulator tank to allow constant speed synchronous power generation. If necessary, the PTO apparatus or other motive force (such as springs or weights) can assist gravity in timely returning the elongated buoyant float(s) on its downward and forward return stroke during approaching wave troughs. The PTO resistive force can also be controlled during each wave cycle to match the previously sensed frequency and amplitude of each oncoming wave.

Elongated buoyant float(s) or barrier(s) 9 constraining tracks 10 are mounted on a relatively stationary stabilized floating frame comprising one or more hollow frame column(s) or tanks 20 or other frame members, a portion of which protrude above the still water surface during normal operation. It is advantageous to use the floating controlled submergence depth frame of the present disclosure (rather than a fixed depth frame) to prevent the adverse performance impact of tidal water level changes on a WEC's wave energy capture efficiency, to adjust the submerged depth and track 10 slope angle for optimum energy capture, and to provide for total float(s) submergence for severe sea state survivability.

The floating vertical buoyancy column(s) 20 or similar frame members have a lowest section extending into relatively deep undisturbed water. This lowest section 21 may contain a high density ballast material such as metal or concrete with a hollow frame section 22 containing or comprising a tank that may be totally or partially filled with sea water ballast 23 to an adjustable level. Floating column(s) 20 may be raised or lowered by alternatively discharging water 23 or air 24, supplied by air compressor 25 out of air discharge valve 26 or water vent 30. The frame 20 or attachments 41 thereto (disclosed more fully below), are anchored to a seabed 28 attachment point either directly or through an up-sea submerged or surface-mooring buoy by affixed mooring line(s) 31. Alternatively, the controlled submergence frame can be flexibly attached to a tower or a platform member of a floating or seabed affixed off-shore wind turbine, or oil or gas production platform.

To eliminate or reduce any vertical wave-induced heaving motion in the frame 20 and rigidly attached track(s) 10, one or more motion stabilizing drag planes or plates 32 are attached to the bottom extended section 21 of the columns 20. The planes 32 may have extended vertical edges 33 around their perimeter to entrap more water mass, further preventing upward and downward heaving. The entire WEC can be partially or fully submerged to avoid damage from severe sea states by the use of the variable ballast tank(s) 22 and compressed air system 25 and 26.

The wave energy capture efficiency of the WEC of the disclosure may be further enhanced by the optional addition of a planar (shown) or curvilinear (shown in FIG. 6, element 54) wave shoaling or focusing plate or plane 40 preceding the elongated floating wave absorption barrier(s) frontal surface 1 and down-sloping at approximately the same angle as the barrier(s) 9 rearward surface 2 and constraining track 10. The plate 40 may have vertical and converging (forward to rearward) or parallel (to one another) side plates or shields 41 to further focus oncoming waves and to increase their height or impact velocity as they approach and impact the floating barrier(s) forward surface 1. The wave focusing plane or plate 40, with optional side walls, 41 is supported and rigidly attached to the frame's vertical floatation column(s) 20 and/or track(s) 10 via support frame 42. Wave focusing plane 40 also provides stabilization against wave induced heaving or pitching of the frame increasing the "effective" or mass of the frame by the mass of water adjacent to, entrapped by, and resisting, the movement of shoaling plane 40. To the extent to which the weight of plate 40 and its frame 42 move the center of gravity forward of the WECs center of buoyancy, causing it to list forward, buoyant material 43 may be attached to, or be part or all of, the plate 40.

It is desirable to have the WEC of the disclosure always naturally point towards oncoming wave fronts rather than permanently fixing its orientation towards the direction of prevailing waves. This can be done by having mooring line(s) 31 converge to a single pivoting point at or above its seabed attachment point (see FIG. 13). The wave induced resistive lateral forces applied against the WEC will keep wave impacting surface 1 relatively parallel to oncoming wave fronts. By attaching mooring line 31 to a relatively high and forward attachment point on the frame (or shoal plane side walls 41), the frame can be further stabilized against wave induced pitching or lateral movement.

Figure 11:
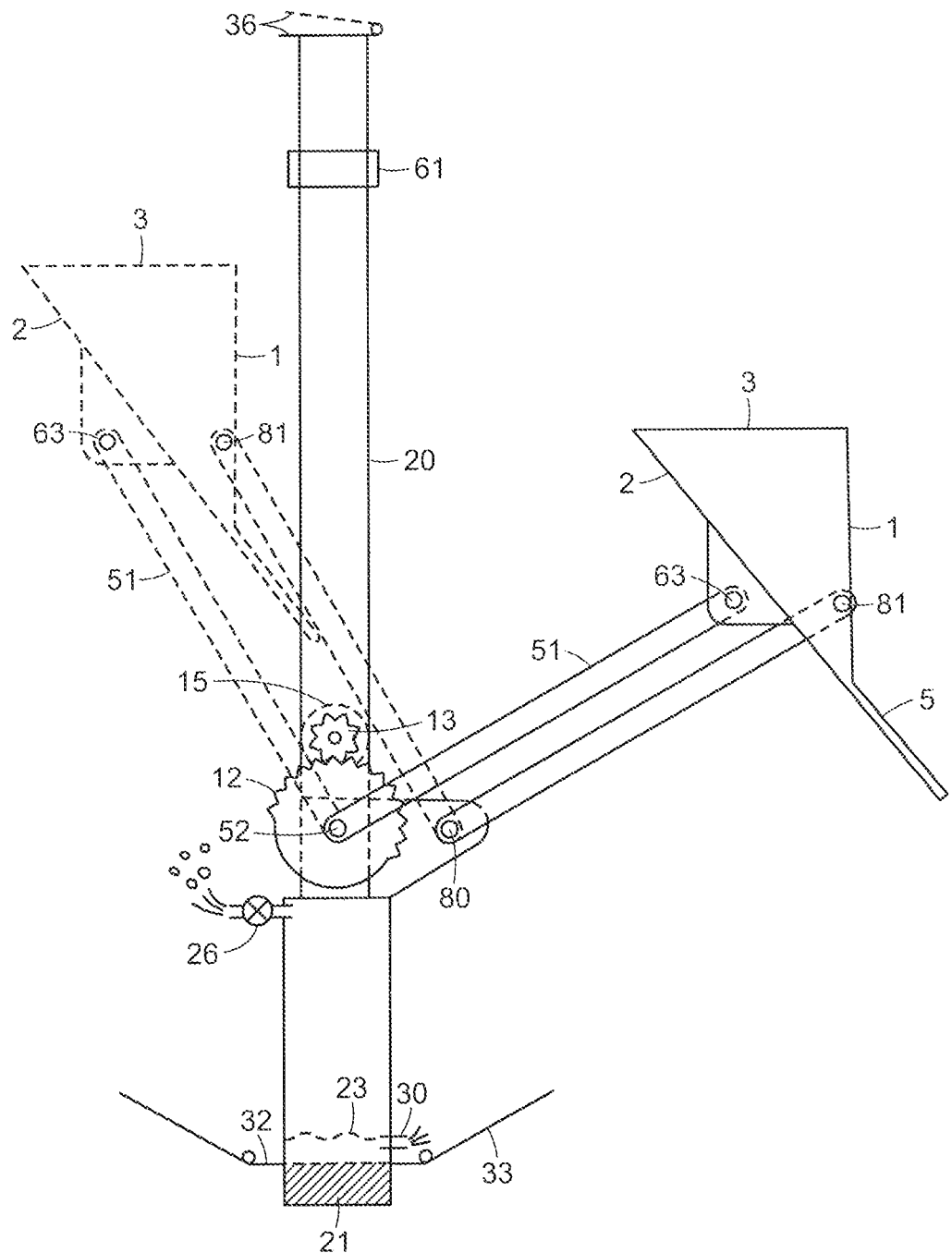
FIG. 11 is a side/elevational, sectional view of the middle portion of a yet further aspect of the disclosure wherein the float is attached to the frame with two parallel swing arms to maintain the vertical orientation of the float's wave-impacting face throughout its arc of motion.

Referring now to FIG. 6, an embodiment of the disclosure similar to the embodiment shown in FIG. 5 is shown. Rather than having vessel motion constrained by tracks 10, the float(s) motion and orientation is defined by connecting arm(s) 51 moving about pivot point(s) 52 supported and affixed to floating vertical column(s) 20 by mounting strut(s) 53. An optional curvilinear wave shoaling plane or plate 54 increases oncoming wave height and impact force on floating wave barrier(s) face 1 in similar fashion to plate 40 in FIG. 5. The plate 54 may have, optionally, vertical side shields (not shown) similar to attachments 41 in FIG. 5. The embodiment of FIG. 6 is directly tethered to a single seabed pivoting mooring point 35 by twin mooring cables 31 attached to each side of shoaling plane 54. Alternatively, the WEC could pivot about a surface or submerged (FIG. 13) mooring ball or buoy or a bottom affixed vertical piling or tower. The dotted profiles of FIG. 6 buoyant float(s) and lever arms show float positions both forward and rearward of the vessel position on the still water line 18. As shown in FIG. 6, the float transfers captured wave energy to a PTO electrical generator 15 through a pinion gear 13 and bevel gear 14 using one or more arcuate gear racks 12 affixed at or near the float(s)' bottom 2 (shown) or to a gear or arcuate gear rack affixed to swing or lever arm 51 (as shown in FIGS. 7, 8, and 11).

Figure 7:
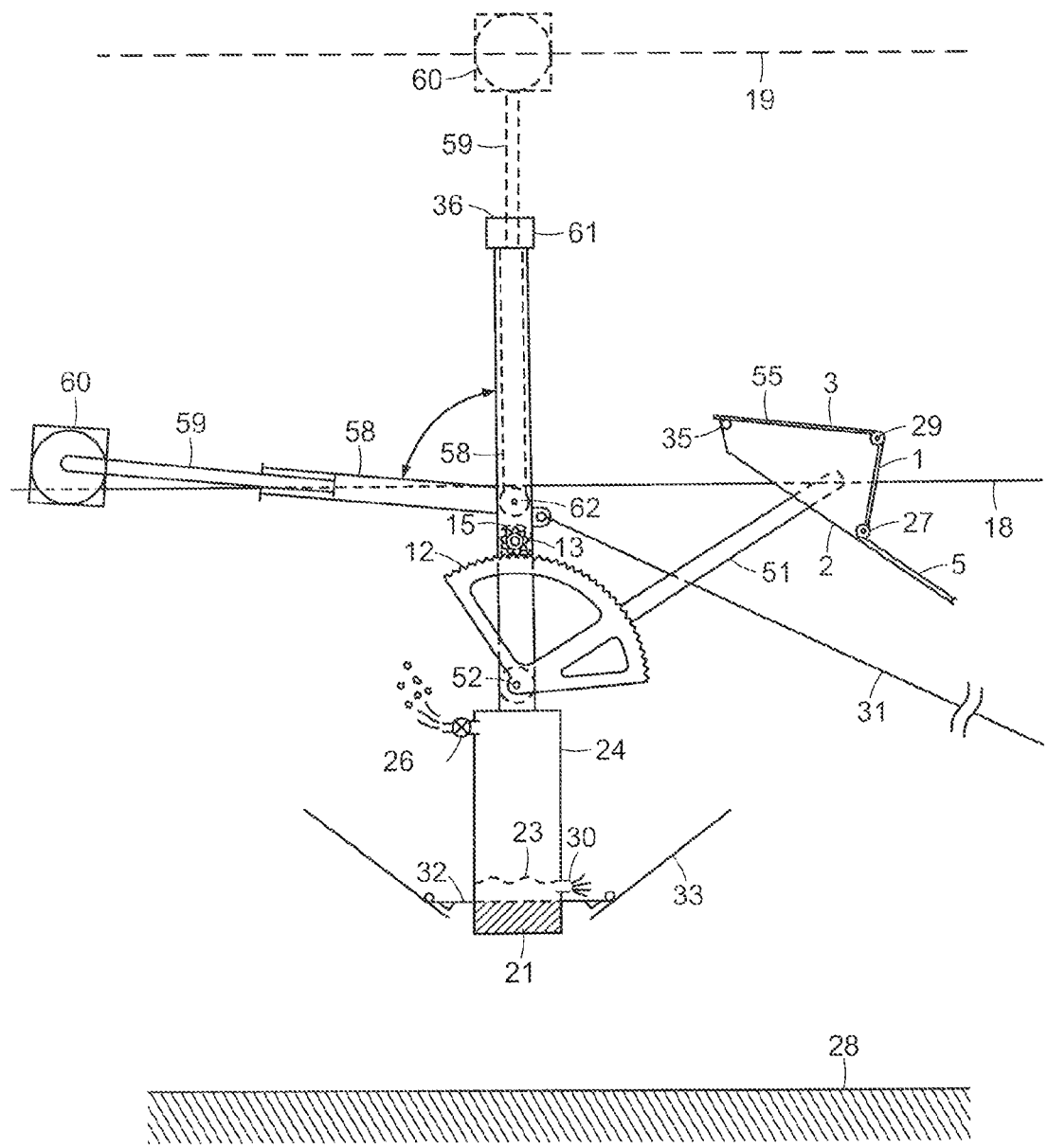
FIG. 7 is a semi-submerged side elevational view of an embodiment according to a further aspect of the disclosure with a forward elongated float rotatably mounted to the frame by swing or lever arms and with a second float extending rearward on longer lever arms firmly fixed to the frame during normal operations, to provide added pitch stability, and rotated upwardly during sever sea conditions when the frame and the forward float is submerged.
Figure 8:
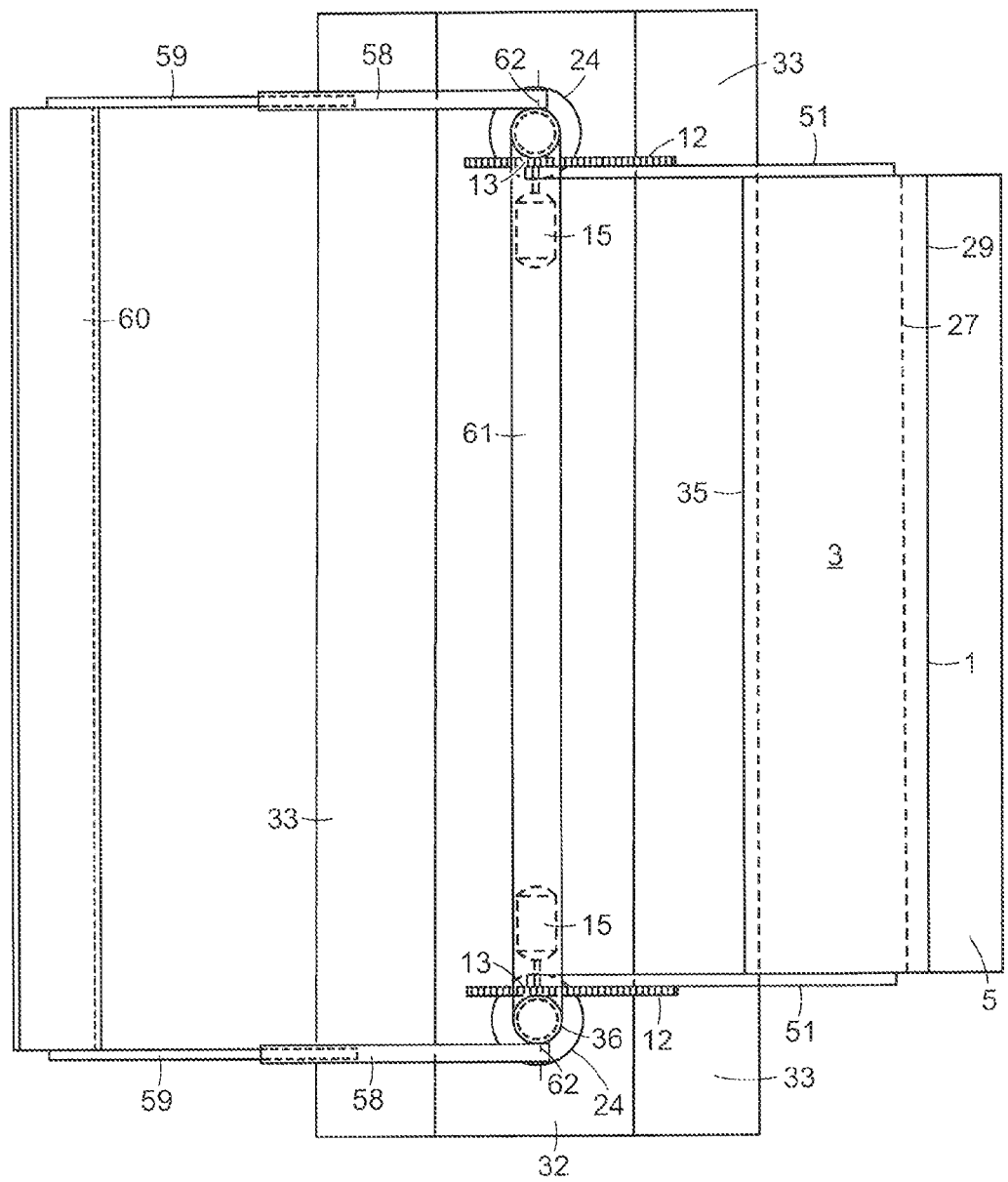
FIG. 8 is a plan/overhead view of an embodiment according to another aspect of the disclosure identical to FIG. 7 except that the rearward float, rather than being locked to the frame during normal operations, rotates about its swing arms in response to waves and drives either its own power take-off apparatus (within the frame columns) or the power take-off apparatus of the forward float.

FIGS. 7 and 8 (depicting a sectional elevation and plan view, respectively) show two embodiments of the disclosure with a first forward float(s) attached to lever arms 51 extending generally forward and attached to the frame at a point 52 substantially below the still water line 18 (similar to the embodiment shown in FIG. 6), thereby defining a sloping arcuate motion for the first forward float(s). A second elongated float(s) is extended generally rearwardly on lever arms (58 plus 59), preferably longer than lever arms 51, from frame attachment point 62, which point can be near the surface (shown) or substantially below the surface near or at point 52.

In one embodiment, during normal WEC operations, the position of lever arm 58 is locked relative to the frame with rearward float 60 floating at or near the still water line 18. This rearward fixed position (relative to the frame) of this second rearward float provides additional pitch stability to the frame when induced by oncoming wave lateral/surge forces impacting the forward float and the shoaling plane below and forward of the plane (53 in FIG. 6 but not shown in FIG. 7). During severe sea conditions when the submerged depth of the controlled submergence frame is increased and the forward float is fully submerged by the frame submergence, optionally supplemented or effected by using the power take-off apparatus in reverse to sink the first forward float(s), lever arms 58 are unlocked and released at point 62 and allowed to swing upward toward a vertical position providing residual buoyancy as the remainder of the WEC is fully submerged below the still water line 18. This position is depicted by the dotted lines and dotted still water line 19. Rearward lever arm 58 plus 59 is configured with a portion of 59 sliding within or along lever arm 58 such that its combined length can be further extended to increase its pitch stabilizing moment (during normal operations), or allowing increased WEC submerged depth (during severe sea conditions when the WEC is not operating).

In the alternative embodiment shown in FIGS. 7 and 8, swing arm 58 is not locked to the frame during normal operations, but instead is permitted to pivot about its pivot point 62 driving the same or its own independent PTO apparatus. In both embodiments, the rearward float lever arms 58 & 59 are longer than forward lever arms 51 and positioned and configured to allow the forward float to swing past vertical and to or past the rearward float and its arms without contact or interference between the floats and their respective lever arms.

One or more cross beams 61 (near top of the vertical frame members) provides additional structural integrity. Heave stabilization drag plates 33 are hinged to horizontal drag plates 32 (attached to the frame bottom) such that they open to entrain maximum water mass and drag force against upward wave-induced heave forces while reducing drag force when returning to their lower position.

Figure 9A:
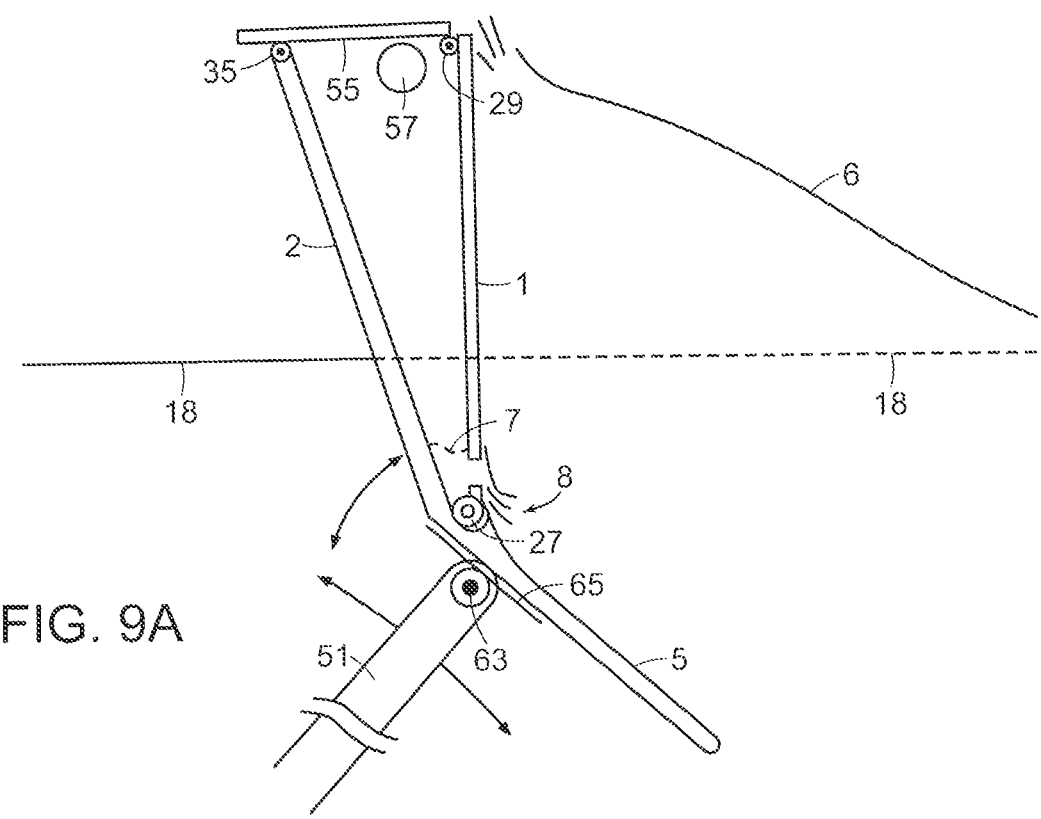
FIGS. 9a and 9b are semi-submerged side/elevational views of elongated floats of still further embodiments of the disclosure with the floats mounted to swing arms with spring-loaded hinged joints, otherwise similar to FIGS. 6, and 7. The float of FIG. 9a has a covered internal cavity for seawater ballast, or reduced buoyancy, during submerging while the float of FIG. 9b has high density ballast at its bottom to maintain the forward wave impacting face in a relatively vertical plane during normal operations and to rotate rearwardly during severe wave impacts.
Figure 9B:
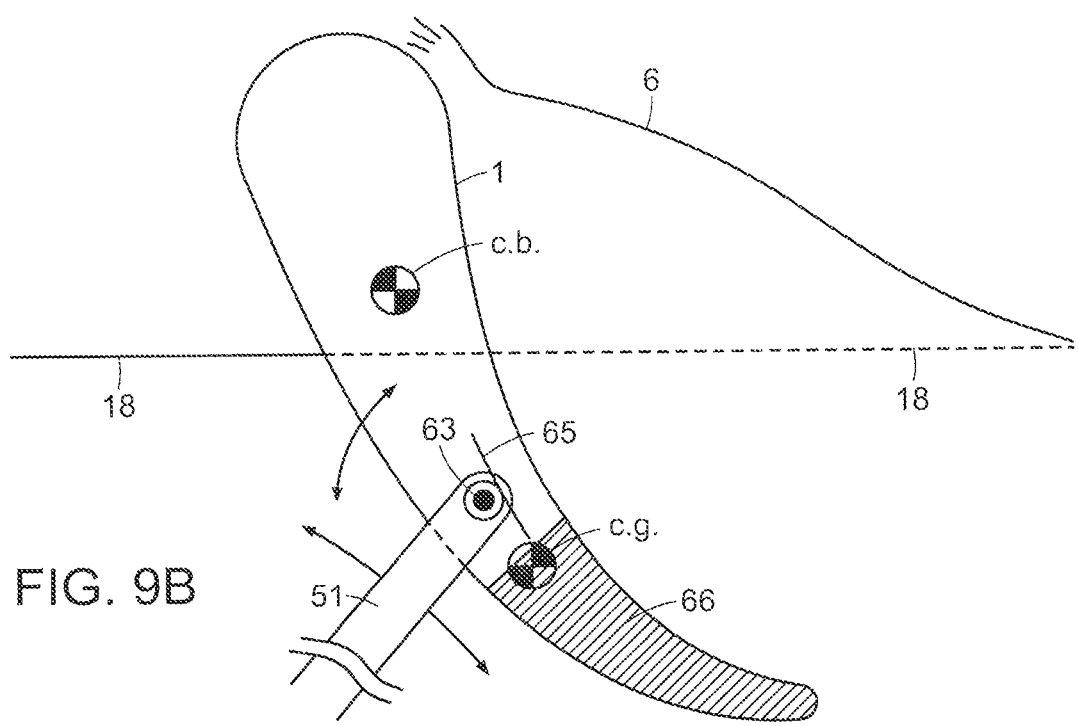

Referring now to FIGS. 9*a* and 9*b*, shown are elevational views of alternative forward float(s) of the disclosure and the upper section of their connecting swing or lever arms. The embodiment of FIG. 9*a* depicts a forward float configured similar to FIGS. 6, 7, and 8 except that it is flexibly connected to lever or swing arm 51 at hinge point 63. The hinge joint also contains a torsion spring 65 or a torsion bar hinge pin (not shown) to restore the position of the float fixed relative to the arm 51 unless impacted by unanticipated large waves, in which case it rotates rearward (counterclockwise). The vessel dimensional configuration is also substantially higher or taller vertically and shorter, or less dimensionally deep (front wall 1 to rear wall 2) even without lower extension plate 5. This taller more slender (fore to aft) shape penetrates deeper (vertically) into the water column and provides additional surge or lateral wave force impacting area (on face 1 and lip 5) while presenting less potentially destructive drag forces when the float is rotated rearward by unanticipated extreme waves.

FIG. 9*b* shows an alternative forward float which can utilize the spring or torsion loaded hinge 65 shown in 9*a* or use a hinge without such a return spring. A lower portion of the float, below the hinge point 65, is comprised of a high density ballast material placing the float's center of gravity below the hinge point 65 while the upper portions are buoyant with a center of buoyancy above the hinge point 65. This allows gravity to maintain or restore the float(s) front face 1 to a relatively vertical position after being rotated rearward (counter clockwise) by unanticipated large wave surge forces. The FIG. 9*b* embodiment also utilizes the taller more slender float shape for the reasons described with respect to the embodiment shown in FIG. 9*a*.

Figure 10:
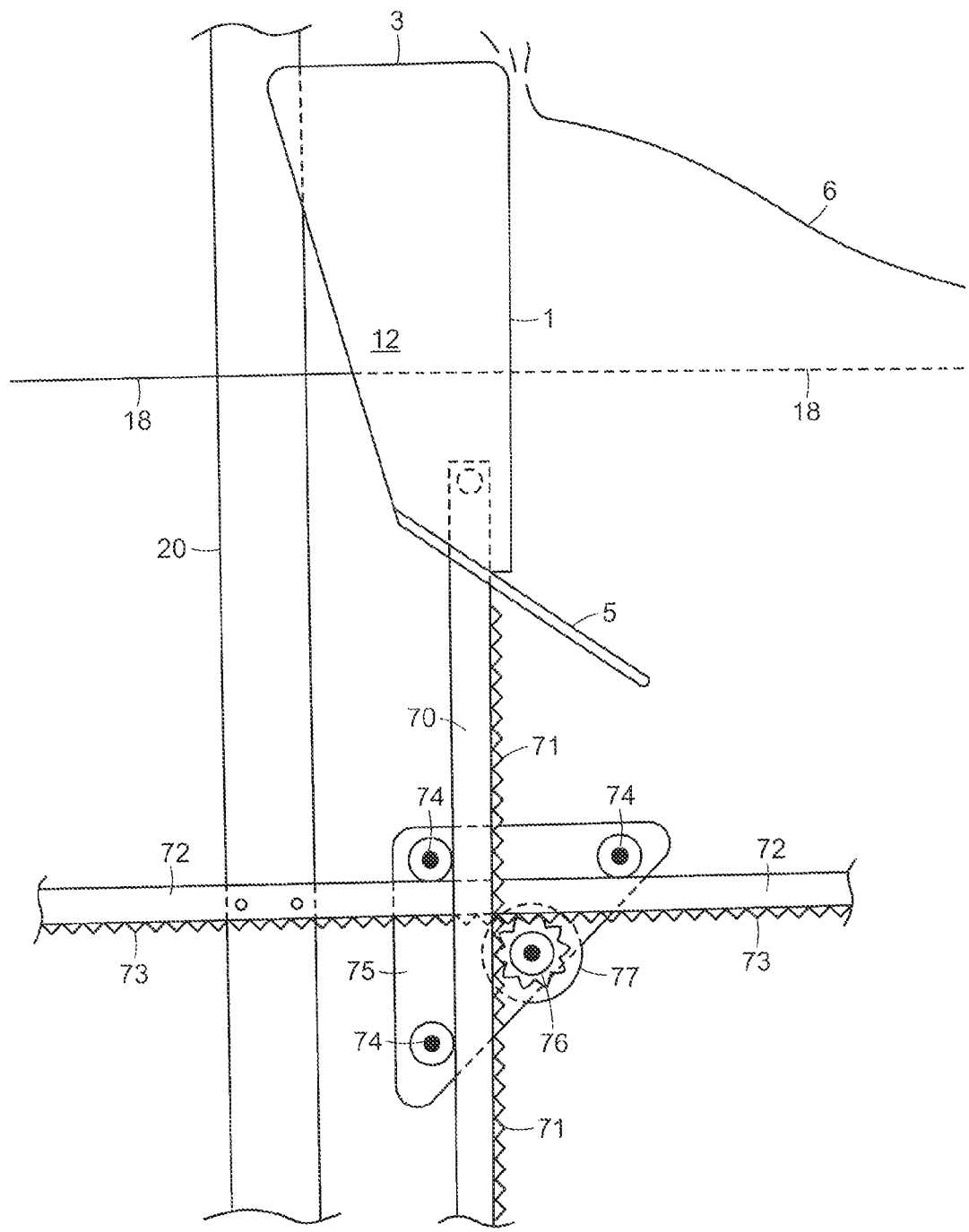
FIG. 10 is a side/elevation partial view of an embodiment of the present disclosure wherein a carriage riding on a lateral beam rigidly attached to the frame allows lateral movement of the float overhead which float is attached to a vertical arm constrained to vertical motion on the same carriage.

FIG. 10 shows an elevational view of a section of an embodiment of the disclosure where the forward float is mounted on one or more beams or arms 70 constrained to substantially vertical motion by idler rollers 74 and a pinion gear 76 mounted on a carriage 75 which carriage is itself constrained to lateral motion (either horizontal or slightly sloped) by idler rollers 74 and pinion gear 76 and a second beam or arm 72 fixed to vertical frame member 20 at the horizontal or sloped angle. Beams 70 and 72 have integral or attached gear racks engaging pinion 76 driving rotary electric generator 77 or other power take-off means. This configuration allows the forward float to capture both heave (vertical) and surge (lateral) wave forces while maintain float face 1 in constant substantially vertical position. Bottom hinged (without being extended on the lever or swing arms of the disclosure) floating flap gates like related art FIG. 1 capture little or no wave heave energy because they cannot move vertically and capture only a portion of wave surge or lateral forces and energy because the top of the flap moves laterally too easily while the hinged bottom cannot move laterally at all. The embodiment of FIG. 10 moves both vertically and laterally without changing the float forward face 1 angle.

FIG. 11 shows a side sectional view of an embodiment similar to the embodiment shown in FIG. 6, 7, or 8 with at least one forward float with the internal water ballast cavities of FIG. 5,6,7, or 9*a*) or without (as shown). The float(s) is mounted to lever arms 51 through hinge points 63 similar to what is shown in FIGS. 9*a* and 9*b* but without return spring 65 or torsion bar hinge. The wave impacting forward face 1 of the forward float(s) is maintained in substantially vertically by mounting a second set of lever arms aligned parallel to arms 51 at hinge points 80 on the frame and 81 on the float at approximately the same elevations of arm 51 hinge points 52 and 63, respectively, thus forming a parallelogram. Wave energy capture efficiency is improved by maintaining face 1 substantially vertical such that the vertical dimension and submerged depth of the face and any lower extension 5 is maximized so that lateral surge wave impact forces are normal to, rather than oblique to, the face 1. Arm 51 transfers wave forces captured by the float(s) to PTO generator 15 through bull gear 12 and pinion 13.

Figure 12:
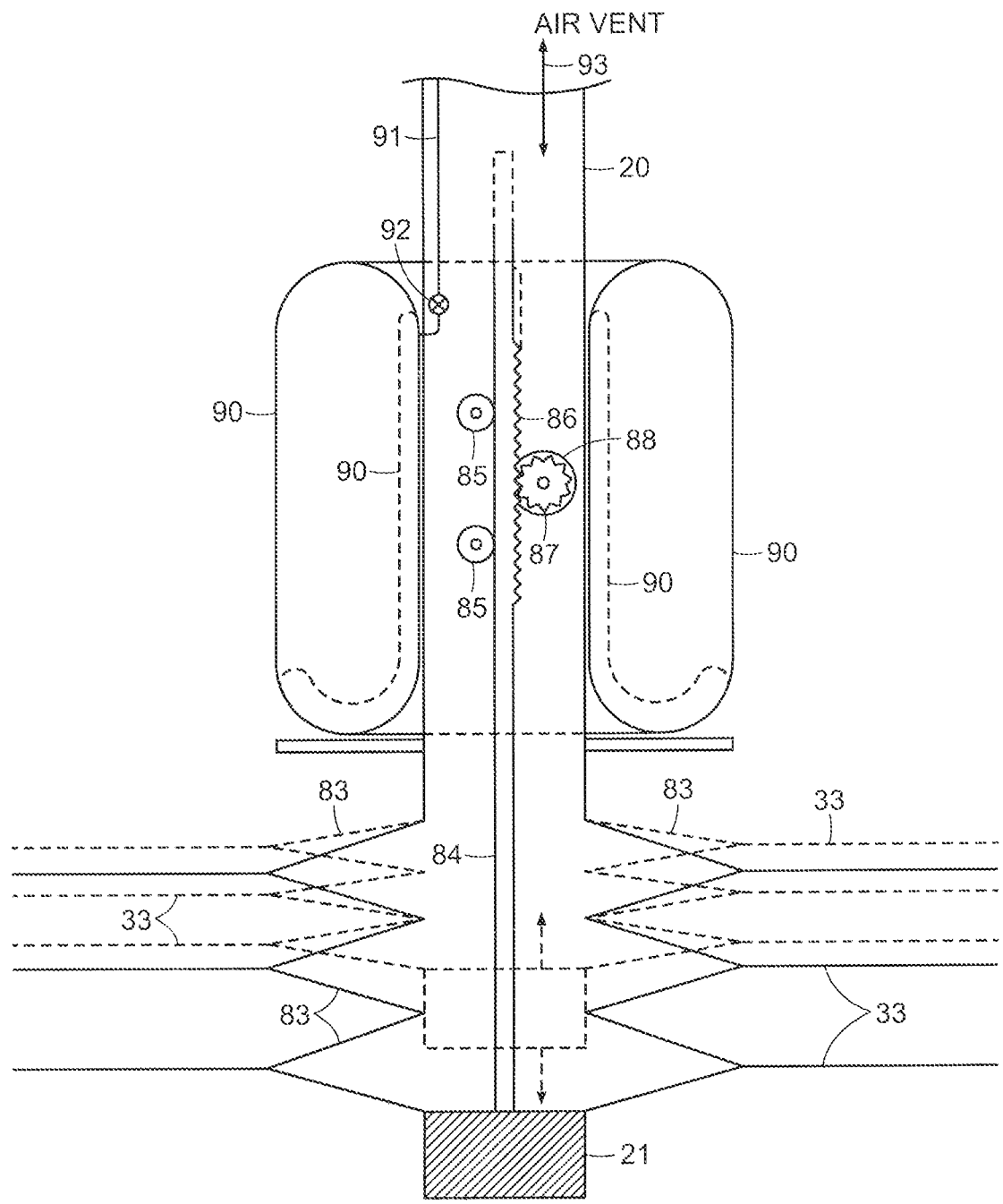
FIG. 12 is a side/elevation sectional view of the lower portion of the frame according to an embodiment of the disclosure showing a bellows and an air bladder to adjust the buoyancy of the frame and/or to provide heave stability.

FIG. 12 shows a sectional elevational view of the lower portion of the controlled submergence frame of the disclosure. Such controlled depth submergence can be achieved by a variety of means including the use of frame integral or attached seawater ballast as shown in FIGS. 5,6,7, or 11, or prior patent application Ser. Nos. 13/199,607 and 13/506,680 of which this application is a continuation-in-part. Other means (not illustrated) include gravity weights or sea bed attachments connected to the frame by cable winches or seabed attached towers, platform legs, tension legs, and/or seabed pilings. FIG. 12 describes two pneumatic frame submergence means of the present disclosure that may be used independently or in combination with other submergence means.

Attached to the bottom or location on the frame 20 is affixed a flexible and compressible air filled metal or composite bellows 83 or internal rib reinforced elastomer bellows (as described in Ser. No. 13/199,607). The bellows is in communication with atmospheric air and is configured to have a return spring constant (or supplemental return spring not shown) sufficient to have the bellows only partially compressed when the frame is at a normal operating WEC submerged depth relative to the still water line. When wave crests are overhead producing upward heave forces on the float(s) and buoyant frame, the bellows compresses due to the increased hydrostatic pressure of the overhead waves, thus reducing the buoyancy of the frame with attached bellows and exerting a downward force to counter the upward buoyant forces. When wave troughs are overhead, the bellows expands, countering downward buoyant forces. When it is desirable to submerge the WEC substantially (during severe sea conditions) or raise the frame, the bellows can be mechanically compressed or expanded, respectively, by a motor driven push rod 84 with gear rack 86 supported by idler rollers 85 against drive pinion gear 87 driven by motor 88.

A second alternative or supplemental frame submergence means uses an annular air bladder 90 or multiple air bladders (not shown) inflated or deflated through a compressed air line 91 and control valve 92 to raise or submerge the frame.

Figure 13:
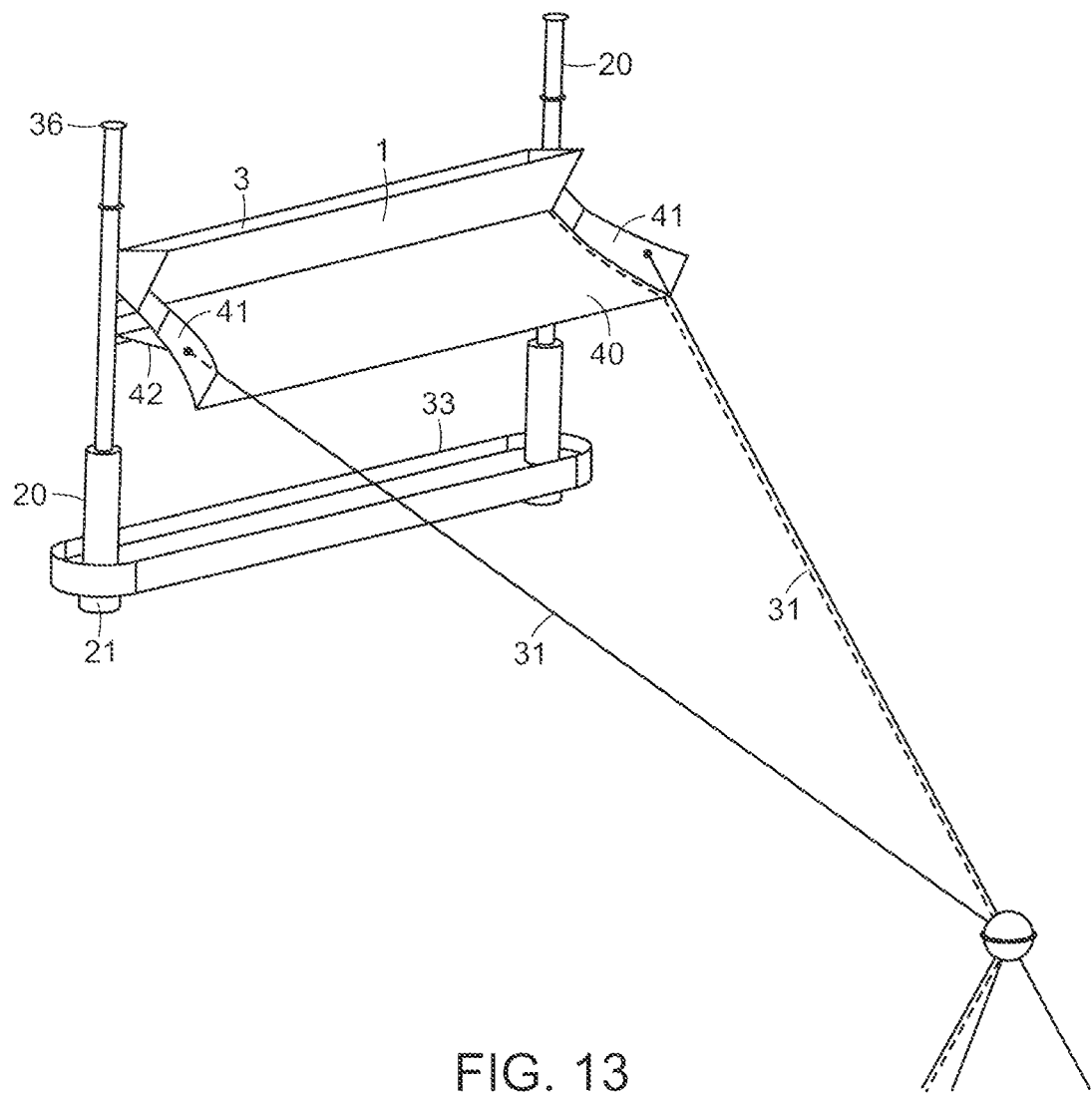
FIG. 13 is an isometric view of an embodiment of the disclosure similar to FIG. 5.

FIG. 13 is an isometric view of another aspect of the embodiment of the disclosure shown in FIG. 5. Attachment cables 31 are connected to a submerged buoy which is attached to the seabed with 3 tensioned cables such that the WEC can rotate about the submerged attachment buoy remaining its wave impacting forward face 1 substantially parallel to oncoming wave front thus intercepting the maximum amount of wavefront containing wave energy at all times.

While the present disclosure has been described in connection with several embodiments thereof, it will be apparent to those skilled in the art that many changes and modifications may be made without departing from the true spirit and scope of the present disclosure. Accordingly, it is intended by the appended claims to cover all such changes and modifications as come within the true spirit and scope of the disclosure.

What I claim as new and desire to secure by United States Letters Patent is:

1. A wave energy converting device comprising:
    at least one elongated float having a wave impacting forward face and a base wherein the face is oriented substantially parallel to oncoming wave fronts, and wherein the horizontal width of the face, alone or in combination with adjacent float faces, is greater than the float front-to-back depth measured excluding any float attachments, extensions or appendages;
    a controllable submerged-depth, buoyant frame movably secured to the at least one float, wherein the frame's submerged depth or force applied through the frames attachment to the at least one float can partially or fully submerge the at least one float, and wherein the frame's motion is at least partially stabilized against wave-induced heave, surge, and pitching motions by its mass, including the mass of any entrained seawater ballast, attached high density ballasts, frame attached drag plates or planes, other frame appendages entrapping additional seawater mass, or by the frame's direct or indirect attachment to the seabed or shore;
    at least one mechanical linkage movably securing and defining the orientation and path of wave-induced relative motion of the at least one float to the frame wherein the linkage is selected from the group consisting of lever or swing arms, roller tracks, slides, linear or hydrostatic bearings, and combinations thereof;
    a device anchor attached to the frame at one or snore points, directly or indirectly, wherein the device anchor is selected from the group consisting of gravity weights, sea bed, anchor or mooring lines, buoys, pilings, towers, off-shore platforms, seawalls, breakwaters, shorelines, and combinations thereof, wherein the anchor may supplement stabilization of the frame against heave, surge, or pitch; and,
    at least one power take-off apparatus secured to, or within, the frame or float and driven by at least one force generated by the relative motion between the at least one float and the frame.

2. The device of claim 1 wherein the at least one float has portions defining at least one cavity with apertures to controllably receive and release seawater.

3. The device of claim 2 wherein the apertures include hydrostatic pressure or mechanically actuated or controlled seawater drains.

4. The device of claim 1 wherein the at least one float is secured at or near its base to the buoyant frame via a hinge whereby the at least one float can rotate about its base in response to severe impacts from large waves and subsequently rebound back to a prior position.

5. The device of claim 2 wherein the at least one cavity has a cover configured to prevent water from flowing into the at least one cavity.

6. The device of claim 1 further comprising a plurality of floats oriented side by side on the buoyant frame, wherein each float shares or has dedicated mechanical linkages and power take-offs.

7. The device of claim 1 further comprising at least one rearward or second elongated float deployed rearward of, and oriented substantially parallel to, the at least one float, wherein both floats are mechanically linked to the frame by swing or lever arms comprising forward arms secured to the at least one float and rearward arms secured to the at least one second float, wherein the forward and rearward arms are of differing lengths and widths to avoid float or lever arm interference or contact with the other if the forward or rearward arms or floats rotate to or past the other, wherein the forward arms drive at least one power take off apparatus while the rearward arms and float are extended rearwardly and substantially immobilized with respect to rotation relative to the frame during normal operation and rotated to a substantially vertical position when the frame and the at least one float are substantially submerged during severe sea conditions.

8. The device of claim 1 further comprising at least one rearward or second elongated float located rearward of, and oriented substantially parallel to, said at least one float, both floats being mechanically linked to said frame by swing or lever arms comprising forward arms secured to the at least one float and rearward arms secured to the at least one second float wherein the forward and rearward arms are of differing lengths and widths to avoid float or lever arm interference or contact with the other if said forward or rearward arms or floats rotate to or past the other, both forward and rearward arms driving the same or independent power take-off apparatus.

9. The device of claim 1 wherein the at least one float is attached to the frame by at least one lever arm having at least one point or appendage to allow the attachment of high density gravity weights to alter the rotating mass of the float and its lever arms, the submerged depth of the float, and the angle of the arms relative to the frame and relative to the still water line.

10. The device of claim 9 wherein the flexible attachment point of the at least one lever arm to the at least one float is at a point at or near its bottom or base and near or forward of the float's forward face with the weights to allow the float to rotate rearward during impact with severe waves while returning subsequent to such impacts, the float is shaped such that its hydrodynamic drag from severe impacting waves is substantially reduced during such rotation.

11. The device of claim 9 wherein the flexible attachment point of the at least one lever arm to the at least one float is at a point above the float's center of gravity and below the float's center of buoyancy with the weights to allow the float to rotate rearward during impacts with severe waves while returning subsequent to such impacts, the float is shaped such that its hydrodynamic drag from severe impacting waves is substantially reduced during such rotation.

12. The device of claim 1 wherein th at least one float is affixed to a movable extension of at least one first lever arm mechanically linked with the frame to define either an arcuate orliner motion of the arm, the movable extension allowing substantially vertical motion of the float by wave buoyant or heave forces while the arm concurrently allows substantially horizontal motion by wave surge forces,both forces and motions driving either a common or separate power take-offs.

13. The device of claim 1 further comprising at least one rotatable second lever arm mechanical linkage between the at least one float and the frame approximately parallel to, and fore or aft of, the at least one first lever arm to reduce, eliminate, or reverse the angular rotation of the at least one float as the first and second lever arms rotate in response to wave forces on the float, either arm transferring such wave forces to a power take-off apparatus.

14. The device of claim 1 wherein the connection point of the at least one mechanical linkage between the float and frame is located substantially below the still water line.

15. The device of claim 1 wherein the at least one mechanical linkage's frame to float length exceeds the float's vertical height excluding appendages.

16. The device of claim 1 wherein the submerged depth of the frame is controlled such that the float's path of motion dictated by the mechanical linkage is adjustable for optimal performance, generally between vertical and horizontal, such that the at least one float moves generally upward and rearward during wave crests and downward and forward on subsequent wave troughs.

17. The device of claim 1 further comprising at least one submerged air filled bellows, bladder, or compressible container affixed to the frame and expandable or compressible to change the buoyancy, submerged depth or orientation angle of the frame relative to the still water line.

18. The device of claim 17 wherein the volume and displacement of the at least one submerged air filled bellows, bladder, or compressible container is in communication with the atmosphere through at least one conduit within the frame, and is at least partially reduced by the increased hydrostatic pressure of overhead wave crests and subsequently increased by the reduced pressure of overhead wave troughs thus increasing the frame's heave stability.

19. The device of claim 1 wherein the at least one power take-off apparatus is selected from the group consisting of direct drive rotary or linear generators, mechanically driven rotary generators, low or high pressure hydraulic pistons, rotary pumps including hydraulic motor or turbine driven electric generators, and combinations thereof.

20. The device of claim 19 further comprising drives for the mechanically driven rotary electric generators selected from the group consisting of rack and pinion, belt and gear belt, capstan, and screw or helical drives.

21. The device of claim 1 wherein the at least one power take-off apparatus can be reversed to produce a force applied from the frame to the at least one float to submerge the float substantially below a still water line during severe sea conditions.

22. The device of claim 1 wherein the at least one float, or the mechanical linkage connecting the at least one float and buoyant frame, has an affixed arcuate or linear gear rack engaging a pinion gear directly or indirectly connected to a power take off apparatus.

23. The device of claim 1 wherein the frame has integral or attached seawater ballast tanks, chambers or compartments to controllably receive or release seawater and concurrently release or receive air to controllably increase or reduce the frame's submerged depth and buoyancy.

24. The device of claim 1 wherein the frames submerged depth control apparatus is selected from the group consisting of seawater-air ballast tanks, variable volume air bladders, bellows, chambers, gravity weights, cable or tension leg attachments to the sea bed and combinations thereof.

25. A wave energy converting device comprising:
at least one elongated float having a wave impacting forward face wherein the face is oriented substantially parallel to oncoming wave fronts, and wherein the horizontal width of the face, alone or in combination with adjacent float faces, is greater than the float front-to-back depth measured excluding any float attachments, extensions or appendages;
a frame movably secured to the at least one float, wherein the frame is configured such that force applied through the frame's attachment to the at least 1 float can partially or fully submerge the at least one float, and wherein the frame's motion is at least partially stabilized against wave induced heave, surge, and pitching motions by its mass including the mass of any entrained seawater ballast, attached high density ballasts, frame attached drag plates or planes or other frame appendages entrapping additional seawater mass, or by the frame's direct or indirect attachment to the seabed or shore;

at least one mechanical linkage movably securing and defining the orientation and direction of wave induced relative motion of the at least one float to the frame wherein the linkage is selected from the group consisting of lever or swing arms, roller tracks, slides, linear or hydrostatic bearings, or combinations thereof;

a device anchor attached to the frame at one or more points, directly or indirectly, wherein the device anchor is selected from the group consisting of gravity weights, the sea bed, anchor or mooring lines, buoys, pilings, towers, off-shore platforms, seawalls, breakwaters, shorelines or combinations thereof, such anchor which may supplement stabilization of the frame against heave, surge, or pitch;

at least one power take-off apparatus secured to or within the frame or float and configured to be driven by the at least one force generated by the relative motion between the at least one float and the frame.

26. The device of claim 25 wherein the frame or frame with the at least one attached float is buoyant.

27. The device of claim 25 wherein the displacement of the frame, including any ballasts, exceeds that of the one or more floats.

28. The device of claim 25 wherein the at least one float has portions defining at least one cavity with apertures to controllably receive and release seawater.

29. The device of claim 25 wherein the rotational connection point of the at least one lever arm mechanical linkage between the float and frame is located substantially below a still water line.

30. The device of claim 25 wherein the submerged depth of the frame is controlled such that the float direction and length of motion defined by the mechanical linkage is optimized for maximum wave energy capture, such motion being generally between vertical and horizontal such that the at least one float moves generally upward and rearward during wave crests and downward and forward on subsequent wave troughs.

31. The device of claim 25 wherein the at least one power take-off apparatus or a second mechanical, electrical, or hydraulic drive is configured to be reversed to produce a force applied from the frame to the at least one float to submerge the float substantially below a still water line during severe sea conditions.

32. The device of claim 25 wherein at least one rotatable second lever arm mechanical linkage between the float and frame is oriented approximately parallel to and fore or aft of said at least one first lever arm and so configured to reduce, eliminate, or reverse the angular rotation of the at least one float's wave impacting face, as said first and second lever arms rotate, relative to the frame, in response to wave induced forces on the float, either arm transferring such wave forces to a power take off apparatus.

* * * * *